(12) United States Patent
Hicks

(10) Patent No.: US 7,712,224 B2
(45) Date of Patent: May 11, 2010

(54) VALIDATING THE ERROR MAP OF CMM USING CALIBRATED PROBE

(75) Inventor: Peter Hicks, Wyoming, RI (US)

(73) Assignee: Hexagon Metrology AB, Nacka Strand (SE)

( * ) Notice: Subject to any disclaimer, the term of this patent is extended or adjusted under 35 U.S.C. 154(b) by 59 days.

(21) Appl. No.: 11/866,453

(22) Filed: Oct. 3, 2007

(65) Prior Publication Data
US 2009/0090013 A1      Apr. 9, 2009

(51) Int. Cl.
*G01B 5/004* (2006.01)
(52) U.S. Cl. .............................. 33/502; 33/503; 702/95
(58) Field of Classification Search ................... 33/502, 33/503, 556, 558, 559, 561, 1 M, 504; 702/94, 702/95; 73/1.79
See application file for complete search history.

(56) References Cited

U.S. PATENT DOCUMENTS

| | | | | |
|---|---|---|---|---|
| 4,819,195 | A * | 4/1989 | Bell et al. ..................... | 702/95 |
| 4,888,877 | A | 12/1989 | Enderle et al. | |
| 5,647,136 | A | 7/1997 | Jostlein | |
| 5,665,896 | A | 9/1997 | McMurtry | |
| 5,687,293 | A * | 11/1997 | Snell .......................... | 700/254 |
| 6,513,253 | B2 * | 2/2003 | Matsuda et al. ............... | 33/502 |
| 6,591,208 | B2 * | 7/2003 | Lotze et al. ................... | 702/95 |
| 6,601,311 | B2 * | 8/2003 | McMurtry et al. ............ | 33/502 |
| 6,701,267 | B2 * | 3/2004 | Noda et al. ................... | 702/95 |
| 6,701,268 | B2 * | 3/2004 | Noda et al. ................... | 702/95 |
| 6,748,790 | B2 * | 6/2004 | Abbe .......................... | 73/1.79 |
| 7,131,207 | B2 * | 11/2006 | McFarland ................... | 33/503 |
| 7,213,344 | B2 | 5/2007 | Jordil et al. | |
| 7,286,949 | B2 * | 10/2007 | McFarland et al. ............ | 702/95 |

OTHER PUBLICATIONS

Paul P. Racine, PHS1 Wrist Users Guide, created Aug. 2001.

* cited by examiner

*Primary Examiner*—Amy Cohen Johnson
(74) *Attorney, Agent, or Firm*—Wolf Greenfield and Sacks, P.C.

(57) ABSTRACT

Validating the error map of a CMM using a calibrated probe including a stylus, the probe capable of rotation about at least one axis, includes placing a calibration artifact on a table of the CMM, the table having an upper surface in an XY plane; positioning a Z-ram of the CMM in a first calibration position and a second calibration position with respect to the artifact such that the stylus contacts the artifact; calculating a measured value representing the measured length between the first and second calibration positions; calculating a nominal value based on the length of the stylus of the probe; comparing the nominal value to the measured value; and updating the error map of the CMM if the measured value differs from the nominal value by more than a predetermined value. The probe and/or the stylus moves relative to the Z-ram such that the calibration artifact remains stationary while the Z-ram is positioned in the first calibration position and the second calibration position.

12 Claims, 4 Drawing Sheets

VALIDATING THE ERROR MAP OF CMM USING CALIBRATED PROBE

BACKGROUND

As shown in FIG. 1, a Coordinate Measuring Machine, or CMM, comprises a measuring apparatus 2, a controller 10, and a computer 12. The measuring apparatus 2 includes a table 4 that generally extends in an XY plane, a bridge 6 spanning the table in the X direction and a carriage 8 supported on the bridge 6. The carriage 8 supports a Z-ram 9, which can move vertically, or in the Z direction. At the end of the Z-ram 9 is an articulating probe 15, such as the type disclosed in the above-referenced U.S. Pat. Nos. 7,213,344; 5,665,896 and 4,888,877.

As is well known, the computer 12 and controller 10 cooperate to drive motors that move the carriage 8, bridge 6 and Z-ram 9 for the purpose of measuring work pieces situated on the table 4. Part of the articulating probe 15, generally a stylus, contacts the work piece and includes switches or sensors that trigger the computer 12 to take a measurement.

The foregoing describes a direct-control CMM, meaning that the CMM can be controlled directly from the computer 12, but direct-controls are but one type of CMM available on the market. Other CMMs are manually controlled or are otherwise not directly controlled by the computer 12. As is well known, manual CMMs have different configurations because of the lack of drive motors.

CMMs are calibrated in the factory using well-known techniques to generate an error map that compensates for errors, including errors introduced during the manufacturing of the CMM. CMM manufacturers typically check, or validate, the quality of the error map itself as part of the process to ensure optimum performance of the CMM. To validate an error map a technician places an artifact, such as a standard ball bar 100 of known length, on the table 4 and brings the probe, whether articulating or not, into contact with the balls on the end of the ball bar as shown in FIG. 2. The spheres may be contacted in more than one position in order to determine the center of this sphere. The measured length of the ball bar is calculated to be the distance between the measured centers of the balls. This can be compared to the known length of the ball bar to validate the error map of the CMM. Generally, the ball bar is measured in several different orientations and locations in the CMM's measuring volume.

One of ways to validate an error map is to validate the squareness error between two of the CMM's axes. In a typical process for validating a squareness error map, a technician typically places an artifact, such as the ball bar 100, on the table 4 of the CMM in two different orientations at two different times. In one orientation, a radial orientation, shown schematically in FIG. 3, the ball bar 100 is oriented to form a 45° angle with the X-axis, while in another orientation, a tangential orientation, the ball bar 100 is oriented at 135 degrees with respect to the x-axis. (Incidentally, while FIG. 3 does not indicate the precise location of the ball bar 100 on the table 4, a technician of ordinary skill knows where to position the ball bar on the table to correctly validate squareness error.)

The squareness error is ten approximated by the following equation:

$$S = (L_{RAD} - L_{TAN})/L_{NOM},$$

Where $L_{RAD}$ is the length of the ball bar in the radial position, $L_{TAN}$ is the length of the ball bar in the tangential direction and $L_{NOM}$ is the known length of the ball bar. If the squareness error is larger than a specified quantity, then the technician knows that the CMM's error map needs correcting.

However, the process of moving ball bars or other calibration artifacts around in the measuring envelope of the CMM is time consuming, and therefore costly.

SUMMARY OF THE INVENTION

Validating the error map of a CMM using a calibrated probe including a stylus, the probe capable of rotation about at least one axis, includes placing a calibration artifact on a table of the CMM, the table having an upper surface in an XY plane; positioning a Z-ram of the CMM in a first calibration position and a second calibration position with respect to the artifact such that the stylus contacts the artifact; calculating a measured value representing the measured length between the first and second calibration positions; calculating a nominal value based on the length of the stylus of the probe; comparing the nominal value to the measured value; and updating the error map of the CMM if the measured value differs from the nominal value by more than a predetermined value. The probe and/or the stylus moves relative to the Z-ram such that the calibration artifact remains stationary while the Z-ram is positioned in the first calibration position and the second calibration position

DETAILED DESCRIPTION OF THE PREFERRED EMBODIMENT

Generally speaking, the preferred embodiment involves using a calibrated, articulating probe head—which may have been calibrated according to any method known in the art, including but not limited to the methods disclosed in U.S. Pat. No. 4,888,877 or 5,665,896, each of which is hereby incorporated by reference—to validate the error map of a CMM. In the preferred embodiment, as the Z-ram 9 moves about a unitary artifact, such as a single-sphere artifact, into the various positions for the Z-ram 9 required by a calibration or error-map-validation routine, the articulating probe 15 allows the probe stylus to contact the artifact and collect a measurement. (The stylus is sometimes called a probe pin, as in U.S. Pat. No. 4,888,877.)

Figure 1:
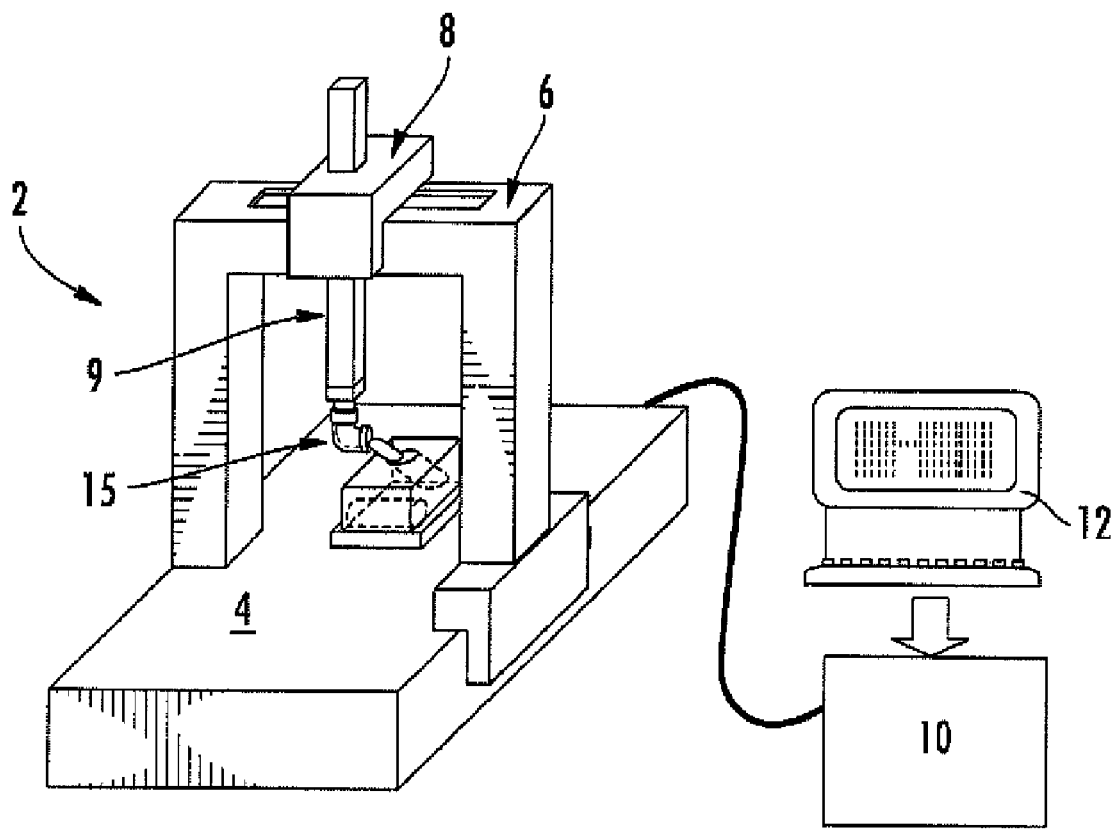
FIG. 1 shows a known CMM.
Figure 2:
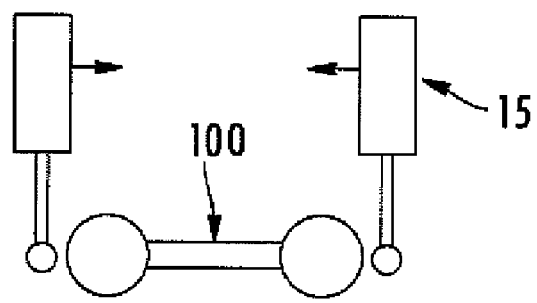
FIG. 2 shows a probe of a CMM coming into contact with a ball bar.
Figure 3:
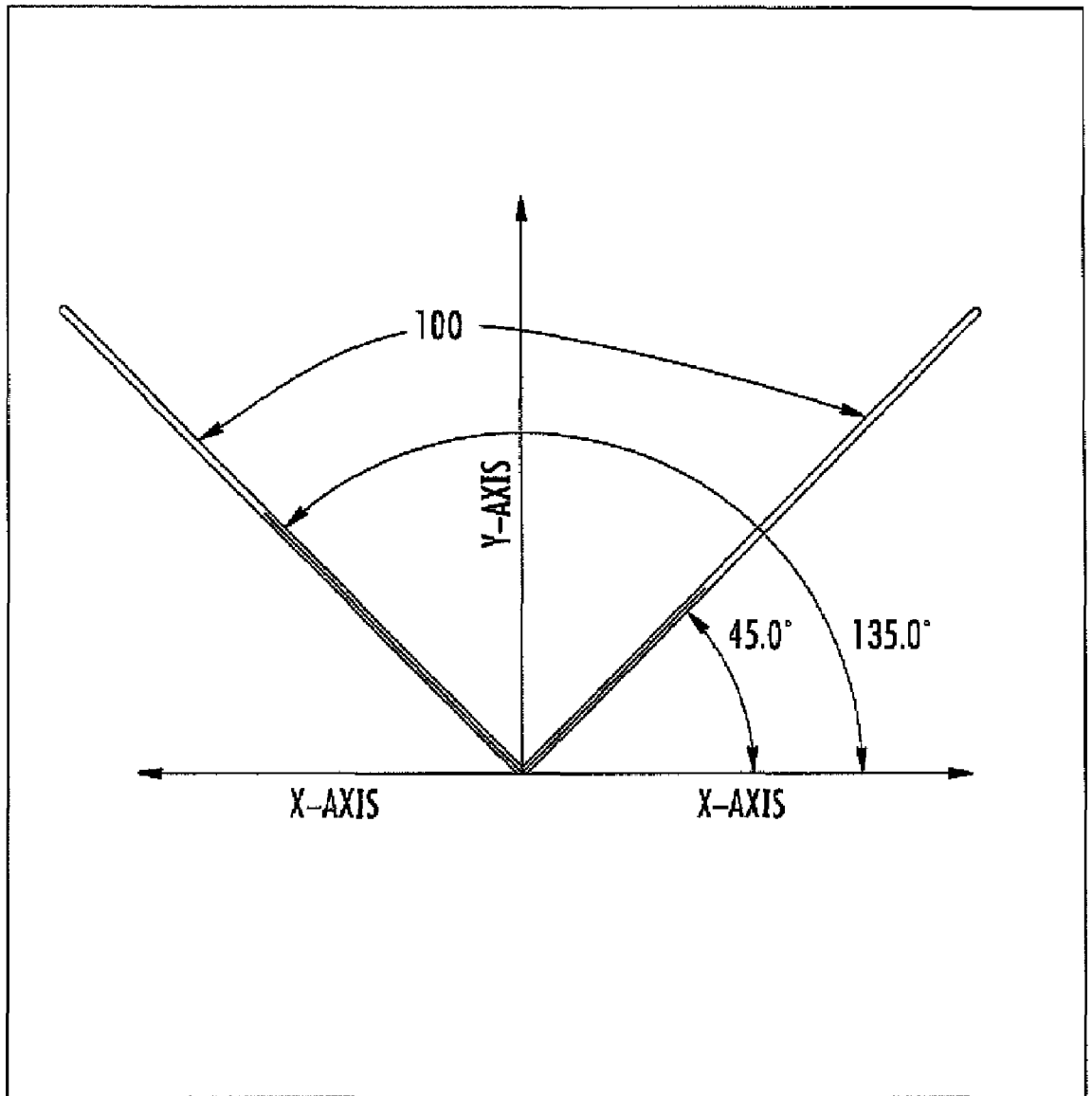
FIG. 3 shows a schematic representation of ball bar on the table of a CMM in a tangential and a radial orientation.
Figure 4:
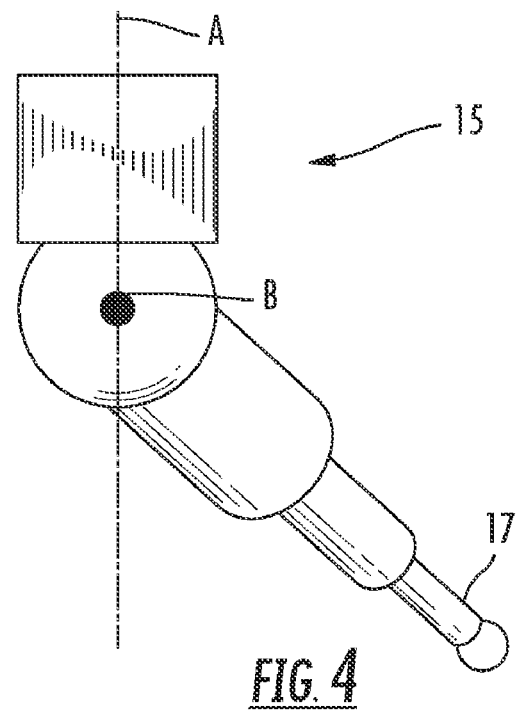
FIG. 4 shows a side view of an articulating probe head and a stylus attached to the probe head.

The articulating probe 15 for use with the preferred embodiment, shown in FIG. 4, comprises a joint and a stylus 17. (See U.S. Pat. No. 7,213,344, which is expressly incorporated herein by reference.) The articulating probe 15 has two axes of rotation. One axis is parallel or co-extensive with the longitudinal axis of the Z-ram 9 and the other axis rotation is perpendicular to the longitudinal axis of the Z-ram 9. (Colloquially, these two axes of rotation are labeled A & B, a usage that happens to be applied in U.S. Pat. No. 5,665,896.) More precisely, the stylus articulates about the B axis while the probe head itself rotates about the A axis. The articulating probe 15 electrically and mechanically connects to the Z-ram 9 in a well-known manner.

Figure 5:
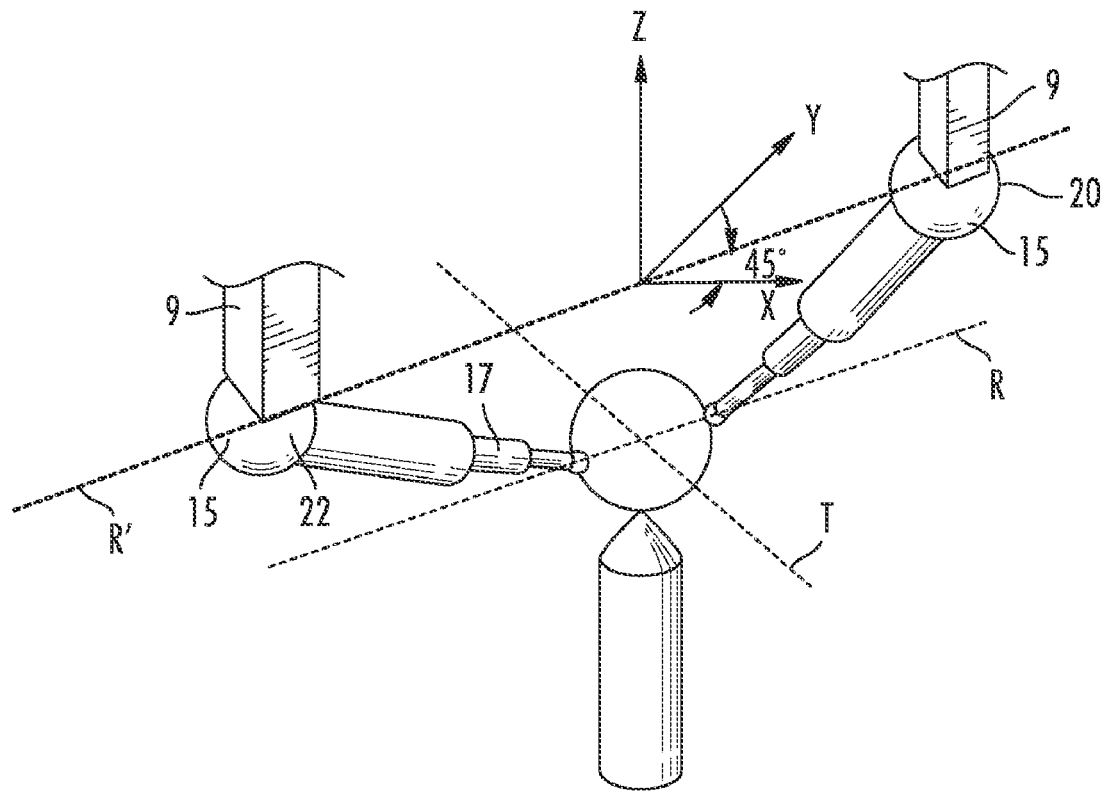
FIG. 5 shows a perspective view of a calibrated, articulating probe attached to a Z-ram of a CMM used to collect measurements in a radial orientation.
Figure 6:
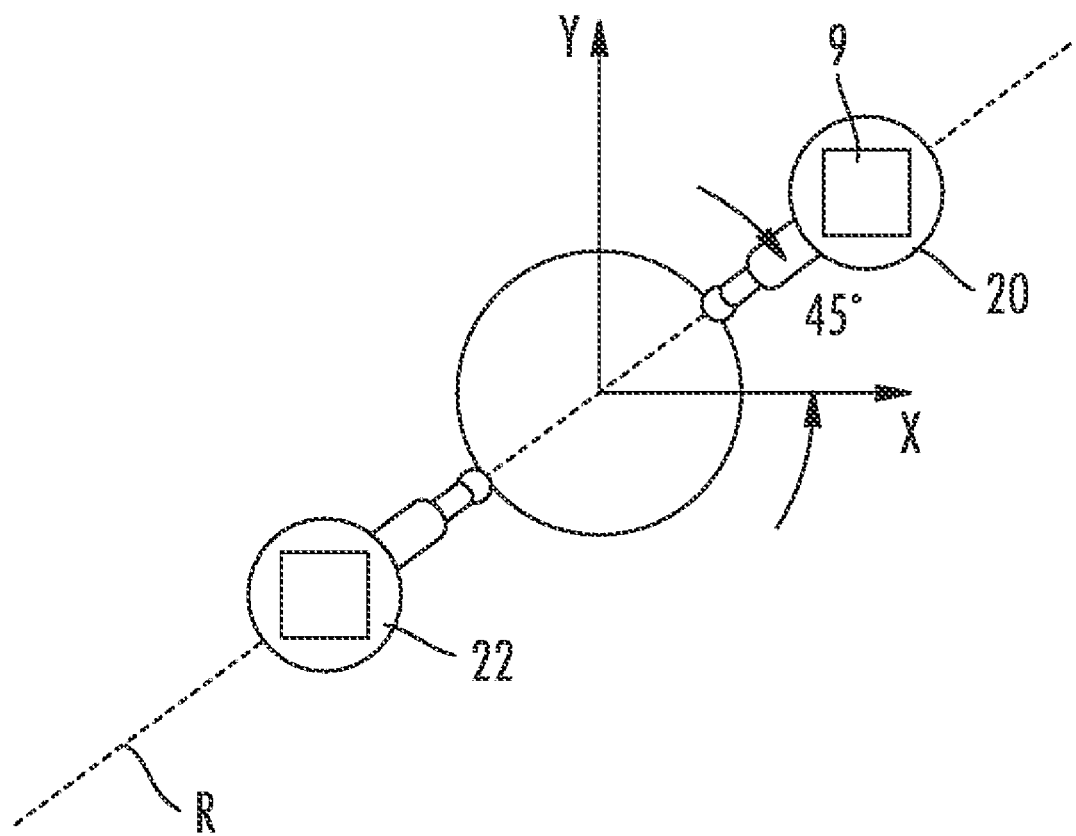
FIG. 6 shows a plan view of the orientation of FIG. 5 looking along the Z direction.

FIGS. 5 and 6 illustrate one example of how the articulating probe 15 can obviate the need for a standard ball bar and the procedures associated with it. In the example, the calibrated, articulating probe 15 is used to determine squareness error.

First, the stylus 17 is oriented at 45° from the longitudinal axis of the Z-ram 9 and the probe ball of the stylus 17 is touched against the sphere artifact. In this position 20, the Z-ram 9 intersects the radial axis R, as shown with especial clarity in FIG. 6. The computer 12 registers the Z-ram 9 coordinates. The Z-ram 9 is then moved 180° from this 45° position 20 to a 225° position 22. Naturally, the articulating probe head is also rotated about its vertical axis to allow the stylus probe ball to come in contact with the sphere on this opposite side of the artifact from the first measurement at position 20. As shown in FIGS. 5 and 6, the positions 20 and 22 of the Z-ram are aligned along a line R' parallel to the radial line R. (One of ordinary skill will understand that the Z-ram need not be oriented this way and may be offset one way or the other according to convenience or the geometry of the probe 15.) The Z-ram 9 coordinates at position 22 are then registered by the computer 12. The computer then calculates the simulated ball-bar length in the radial orientation as follows:

$$L_{RAD}=|RP_{45}-RP_{225}|,$$

where $RP_{45}$ is the Z-ram position at position 20 and $RP_{225}$ is the Z-ram position at position 22. As such, $L_{RAD}$ is the Euclidean distance between the Z-ram 9 at position 20 and position 22.

This calculation can be updated with calibration information for the probe at these orientations as follows:

$$\|RP_{45}+CAL_{45}|-|RP_{225}+CAL_{225}\|,$$

where $CAL_{45}$ and $CAL_{225}$ is the calibration information for the probe when the probe is oriented about the vertical axis A and the horizontal axis B in the manner required to touch the stylus 17 to the artifact as shown in positions 20 and 22, respectively. Specifically $CAL_{45}$ is a correction value for the run-out of the probe tip at 45° and, likewise, $CAL_{135}$ is a correction value for the run-out of the probe tip at 135°.

Next, the sphere artifact is measured in the tangential orientation, shown schematically with a dotted line T in FIG. 5. That is, the Z-ram 9 is moved to a 135° position, which is 135° from the X axis or 90° from the 45°, radial position 20 shown in FIGS. 5 and 6. As in for the measurement to simulate the radial orientation of a ball bar, the probe ball of the stylus 17 contacts the sphere artifact. The computer 12 then registers the Z-Ram position. As with the radial-orientation simulation, the Z-ram 9 is moved to a 315° position, 180° from the 135° position, whereupon the stylus probe ball contacts the sphere artifact and the computer registers the Z-Ram position. The tangential length is then calculated as follows:

$$L_{TAN}=|RP_{135}-RP_{315}|,$$

where $RP_{135}$ is the Z-ram position at the 135° position and $RP_{315}$ is the Z-ram position at the 315° position. As before, $L_{TAN}$ is the Euclidean distance between the Z-ram 9 at the $RP_{135}$ position and $RP_{315}$ position.

This equation can also be updated by a calibration factor as follows:

$$L_{TAN}=\||RP_{135}+CAL_{135}|-|RP_{315}+CAL_{315}\|,$$

where $CAL_{135}$ and $CAL_{315}$ are defined similarly to $CAL_{45}$ and $CAL_{135}$ with allowance for the different orientations.

The squareness error is then as follows:

$$S=(L_{RAD}-L_{TAN})/L_{NOM},$$

where $L_{NOM}$ is calculated as follows:

$$L_{NOM}=2 \cdot SL \cdot \cos(\alpha)$$

In this expression, $\alpha$ is the angle between the stylus 17 and the vertical axis of the Z-ram 9 (i.e., 45° in the example of FIGS. 5 and 6), and SL is the known probe stylus length. If the squareness error is above a predetermined threshold, the technician must take steps to improve the error map of the CMM, such as by updating the error map by recalibrating the CMM.

Incidentally, note that an expression for the ball diameter in the $L_{NOM}$ equation is unnecessary when the system measures to the center of the ball, as is typical. If the system does not measure to the center of the ball, an expression such as TL, a touch length defined as the distance between points of contact of the stylus on the artifact, may be added to the $L_{NOM}$ equation above. With a sphere artifact, the touch length is the length of an arc between the points of contact.

It will be understood that the order of steps can be modified without affecting the scope of the invention. That is, the Z-Ram coordinates at positions about the artifact (e.g., the 45° position 20, the 225° position 22, the 135° position and the 315° position) can all be registered at the appropriate times and the $L_{RAD}$ and $L_{TAN}$ calculations made later in any order after registering the appropriate Z-Ram positions. Also, the squareness approximation can be made anytime after the $L_{TAN}$ and $L_{RAD}$ calculations are made, with or without intermediate calculations or steps.

One of ordinary skill will also appreciate that an articulating probe can measure objects in at least 720 different orientations. Using a calibrated, articulating probe allows measurement of a large number of positions within the machine envelope to validate a number of characteristics of a particular CMM. Once the articulating probe is error-mapped we can measure the sphere from many different Z-ram positions. For example, the information gathered can be analyzed to determine machine geometry errors, or a calibration technician can reposition the sphere (say in the Z axis) and evaluate errors such as pitch. In typical usage it is expected that a technician would measure diagonals in each plane: i.e., XY, YZ, XZ. However, while it is typical to measure diagonals (disposed 180° about an artifact in the same plane), it is not strictly necessary.

The invention claimed is:

1. A method for validating an error map of a coordinate measuring machine using a calibrated probe, the probe capable of rotation about at least one axis, the method comprising the steps of:

placing a calibration artifact at a first artifact position on a table of the coordinate measuring machine, the table having an upper surface in an XY plane;

positioning a Z-rain of the coordinate measuring machine in a first calibration position and a second calibration position with respect to the artifact such that the probe contacts the artifact, wherein the probe moves relative to the Z-ram such that the calibration artifact remains stationary while the Z-ram is positioned in the first calibration position and the second calibration position;

calculating a first measured value representing the measured length between the first and second calibration positions of the Z-ram;

calculating a first nominal value based on the length of the probe;

comparing the first nominal value to the first measured value; and updating the error map of the coordinate measuring machine if the measured value differs from the nominal value by more than a predetermined value.

2. The method according to claim 1, wherein the positioning step includes positioning the z-ram in the second calibration position disposed 180° about the artifact from the first calibration position.

3. The method according to claim 2, wherein the positioning step includes positioning the Z-ram in the first calibration position wherein the Z-ram is disposed in a plane parallel to the XY plane along a radial axis, the radial axis being disposed parallel to a line that is substantially 45° from the X axis of the table, and wherein the step of calculating the first measured value includes calculating the Euclidean distance between the first calibration position and the second calibration position.

4. The method according to claim 2, wherein the positioning step includes positioning the Z-ram in a third calibration position disposed 90° about the artifact from the first calibration position.

5. The method according to claim 4, wherein the positioning step includes positioning the Z-ram in a first calibration position wherein the Z-ram is disposed in a plane parallel to the XY plane along a tangential axis, the radial axis being disposed parallel to a line that is substantially 135° from the X axis of the table, and wherein the step of calculating the measured value includes calculating the Euclidean distance between the third calibration position and a fourth calibration position.

6. The method according to claim 4, further comprising:
positioning the Z-ram in a fourth calibration position disposed 180° about the artifact from the third calibration position; and
calculating a second measured value representing the measured length between the third and fourth calibration positions; wherein
comparing the first nominal value to the first measured value comprises comparing the first nominal value to the difference between the first and second measured values to determine a squareness error.

7. The method according to claim 6, wherein updating the error map of the coordinate measuring machine if the measured value differs from the nominal value by more than a predetermined value comprises updating the error map of the coordinate measuring machine if a squareness error is above a predetermined threshold.

8. The method according to claim 1, wherein the step of calculating the first measured value includes calculating the Euclidean distance between the first calibration position and the second calibration position.

9. The method according to claim 8, wherein the step of calculating the first measured value includes adjusting for calibration information associated with the probe.

10. The method according to claim 1, wherein the step of calculating a first nominal value includes calculating at least one of $2 \cdot SL \cdot \cos(\alpha)$ and $2 \cdot SL \cdot \cos(\alpha) + TL$, where $\alpha$ is the angle between a stylus of the probe and the Z axis of the Z-ram, SL is the known stylus length and TL is the touch length, which is the distance between points of contact of the stylus on the artifact.

11. The method according to claim 1, further comprising moving the calibration artifact to a second artifact position, different from the first artifact position, on the table;
positioning the Z-ram of the coordinate measuring machine in a third calibration position and a fourth calibration position with respect to the artifact such that the probe contacts the artifact, wherein the probe moves relative to the Z-ram such that the calibration artifact remains stationary while the Z-ram is positioned in the third calibration position and the fourth calibration position;
calculating a second measured value representing the measured length between the third and fourth calibration positions;
calculating a second nominal value based on the length of the probe;
comparing the second nominal value to the second measured value; and
updating the error map of the coordinate measuring machine if the second measured value differs from the nominal value by more than a predetermined value.

12. The method according to claim 1, wherein the step of positioning the Z-ram of the coordinate measuring machine in a first calibration position and a second calibration position is repeated for diagonals in each of XY-, YZ-, and XZ planes.

* * * * *

UNITED STATES PATENT AND TRADEMARK OFFICE
CERTIFICATE OF CORRECTION

PATENT NO.        : 7,712,224 B2                                        Page 1 of 1
APPLICATION NO.   : 11/866453
DATED             : May 11, 2010
INVENTOR(S)       : Peter Hicks It is certified that error appears in the above-identified patent and that said Letters Patent is hereby corrected as shown below:

On the Title Page:

Item [75] Inventor: Please correct "(US)" with "(UK)".

In the Specification:

At column 1, line 61, please correct the word "ten" with "then".

At column 4, line 54, claim 1 please correct the word "Z-rain" with "Z-ram".

Signed and Sealed this

Third Day of August, 2010

David J. Kappos
*Director of the United States Patent and Trademark Office*